(12) United States Patent
Wang

(10) Patent No.: US 6,691,838 B2
(45) Date of Patent: Feb. 17, 2004

(54) ADJUSTER STRUT

(75) Inventor: Nui Wang, Croydon (AU)

(73) Assignee: PBR Australia Pty. Ltd. (AU)

( * ) Notice: Subject to any disclaimer, the term of this patent is extended or adjusted under 35 U.S.C. 154(b) by 0 days.

(21) Appl. No.: 10/143,494

(22) Filed: May 9, 2002

(65) Prior Publication Data

US 2003/0006105 A1 Jan. 9, 2003

Related U.S. Application Data

(63) Continuation of application No. PCT/AU00/01377, filed on Nov. 8, 2000.

(30) Foreign Application Priority Data

Nov. 9, 1999 (AU) .............................................. PQ3937
Jan. 17, 2000 (AU) .............................................. PQ5097

(51) Int. Cl.[7] ............................................ F16D 51/00
(52) U.S. Cl. ............................. 188/79.51; 188/196 V
(58) Field of Search ...................... 188/79.51, 79.52, 188/79.54, 79.56, 79.59, 79.64, 196 R, 196 BA, 196 D, 196 V

(56) References Cited

U.S. PATENT DOCUMENTS

| 1,834,530 | A | * | 12/1931 | Lyman ..................... 188/79.55 |
| 2,522,903 | A | * | 9/1950 | Shively .................... 188/79.55 |
| 3,999,636 | A | * | 12/1976 | Schumacher ............. 188/79.56 |
| 4,148,380 | A | * | 4/1979 | Haraikawa ............... 188/79.52 |
| 4,223,765 | A | | 9/1980 | Turak ......................... 188/79.5 |
| 4,385,681 | A | * | 5/1983 | Conrad et al. ........... 188/79.52 |
| 4,621,714 | A | * | 11/1986 | Skurka .................. 188/196 BA |
| 4,623,045 | A | * | 11/1986 | Evans ...................... 188/79.64 |
| 4,702,357 | A | * | 10/1987 | Rozmus ................... 188/79.56 |
| 4,706,784 | A | | 11/1987 | Shellhause ................. 188/79.5 |
| 5,067,596 | A | * | 11/1991 | Johannesen ............. 188/79.54 |
| 5,246,090 | A | * | 9/1993 | Quere et al. ............. 188/79.52 |
| 5,758,750 | A | | 6/1998 | LeMoigne et al. ....... 188/79.64 |
| 6,345,702 | B1 | * | 2/2002 | Tessitore ................. 188/79.52 |

FOREIGN PATENT DOCUMENTS

| EP | 0 262 014 | | 3/1988 | .......... F16D/65/56 |
| EP | 0575825 A1 | * | 12/1993 | |
| EP | 0 936 375 | | 8/1999 | .......... F16D/65/56 |
| GB | 2121896 A | * | 1/1984 | |
| JP | 58131437 A | * | 8/1983 | |

* cited by examiner

*Primary Examiner*—Jack Lavinder
*Assistant Examiner*—Melody M. Burch
(74) *Attorney, Agent, or Firm*—Schwegman, Lundberg, Woessner & Kluth, P.A.

(57) ABSTRACT

A drum brake assembly, adjuster strut (10) being adjustable and having axially extended and retracted conditions. The strut includes means (11, 35) for engaging braking members (3), a rotatable member (27) rotatable about the lengthwise axis of the strut, an axially movable member (34) movable upon forward rotation of member (27) to lengthen the strut in the retracted condition, and biasing means (24) for biasing the strut toward the axially extended condition upon radial expansion of the brake shoes during brake actuation. The rotatable member has a face (30) and a cam surface (31) formed thereon and defining teeth formed in a ring. The strut includes an arm (37) which is mounted to pivot and an end portion (40) biased into engagement with the surface (31). In use, the arm causes the rotatable (27) member to rotate in a forward direction during axial extension of the strut.

29 Claims, 6 Drawing Sheets

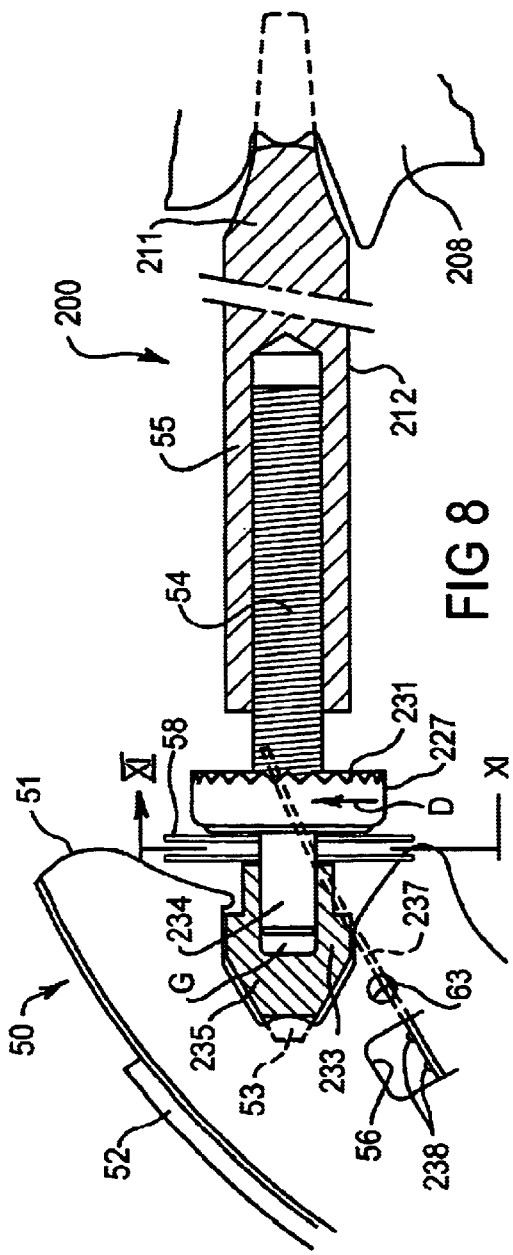
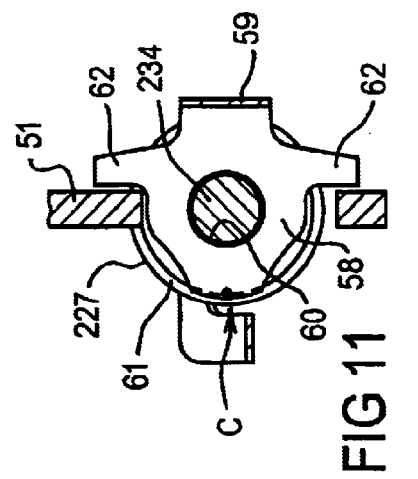
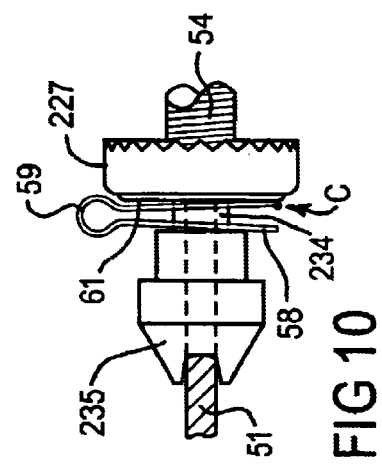
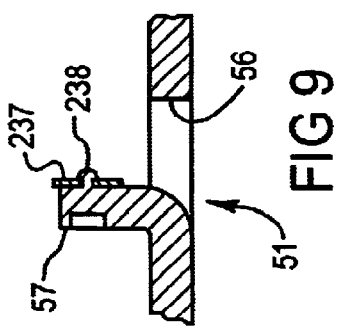

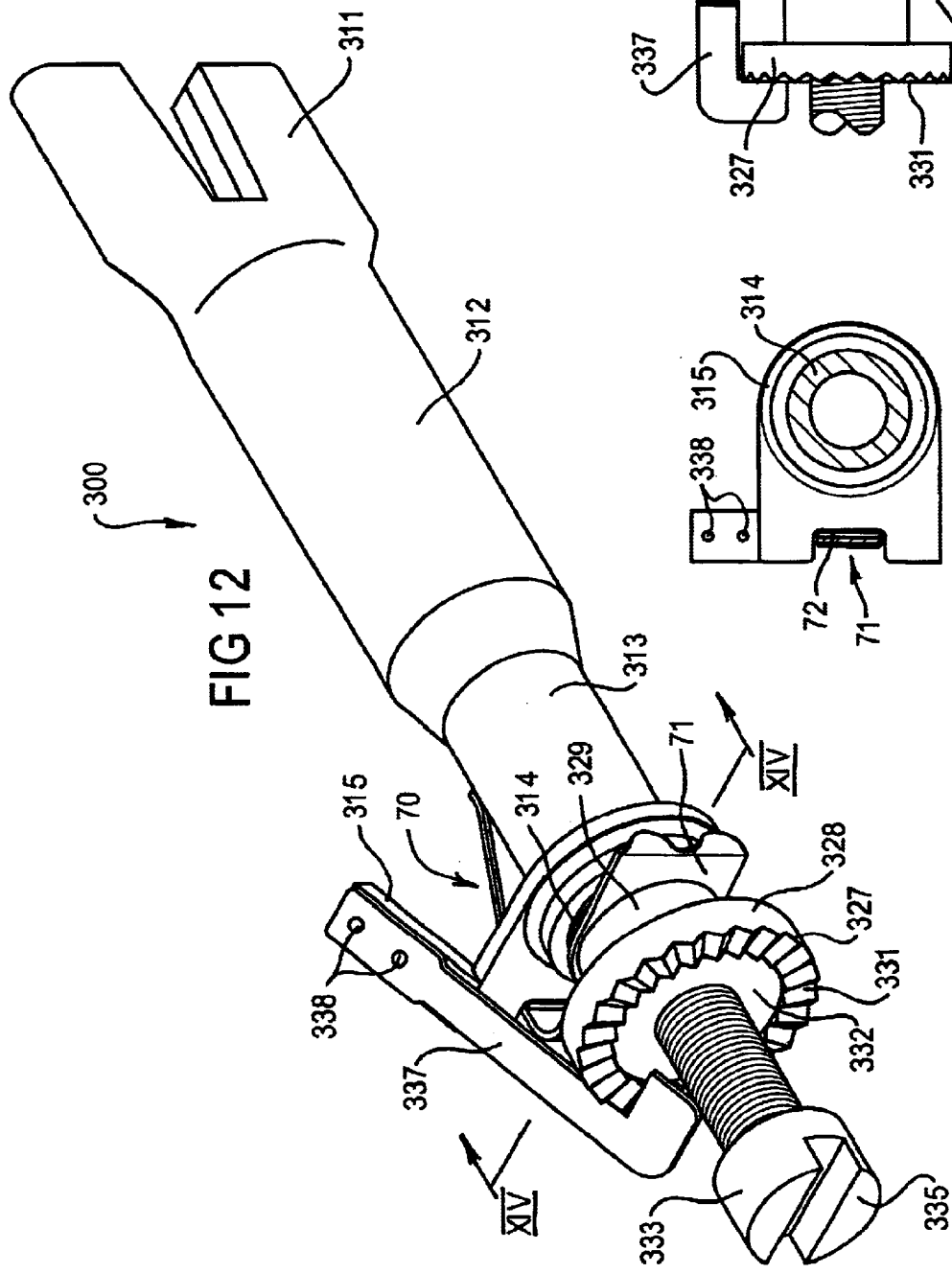

ADJUSTER STRUT

RELATED APPLICATIONS

This application is a continuation under 35 U.S.C. 111(a) of International Application No. PCT/AU00/01377 filed Nov. 8, 2000 and published in English as WO 01/34992 A1 on May 17, 2001, which claimed priority from Australian Application No. PQ 3937 filed Nov. 9, 1999, and Australian Application No. PQ 5097 filed Jan. 17, 2000, which applications are incorporated herein by reference.

FIELD OF THE INVENTION

The present invention relates to an adjuster strut for use in drum brake assemblies to compensate for wear in friction lining.

BACKGROUND OF THE INVENTION

Adjuster struts are employed in drum brake assemblies in order to progressively adjust the separation between pairs of brake shoes as brake friction lining wears. A simplified example of a brake assembly that employs an adjuster strut is shown in FIG. 1, and this shows a drum brake assembly 1. The assembly 1 includes a pair of brake shoes 3 of T-shaped cross-section, an abutment 4 disposed between one pair of facing ends of the brake shoes 3 and about which the brake shoes can pivot, a hydraulic actuator 5 that applies an actuating force during brake actuation against the other pair of facing ends of the brake shoes 3, to move the brake shoes radially outwardly and into braking engagement with the internal braking surface of the drum 2, and an adjuster strut 6. The adjuster strut 6 is disposed generally horizontally in engagement with the inwardly depending web of one (or each) of the T-shaped brake shoes 3 and the web of the parking brake lever and in absence of an actuating force being applied to the brake shoes 3 by the hydraulic actuator 5, the respective webs engage either end of the strut 6 under the biasing influence of a return spring 7 and locate the shoes radially. Thus, the length of the strut 6 determines the radial spacing of the brake shoes 3 when no braking force is being applied. Through use, the friction lining of the brake shoes 3 wears over time and the adjuster strut 6 is lengthwise adjustable to increase the separation of the brake shoes and thus compensate for lining wear. It is the manner in which the adjuster strut is lengthened that the present invention has principal concern.

Various adjustable strut arrangements are known. Australian Patent No. 525459 in the name of The Bendix Corporation, discloses one form of an adjustable strut that employs a pawl and ratchet arrangement. This arrangement is complex and thus is relatively expensive to manufacture. Additionally, the relatively high number of parts that constitute the strut increases the potential for failure, as well as the cost of manufacture and necessity for regular maintenance.

A further strut arrangement is shown in European Publication No. 0262014, in the name of Bendix France and this strut suffers the same drawbacks associated with the above described known strut. This and the earlier known forms of adjuster strut are indicative of known struts in general, which typically are complex in construction.

European patent application EP 936 375 discloses a further strut arrangement that includes a rotatable wheel having internal and external parts. The respective parts are coaxial and are relatively rotatable in one direction of rotation and mutually rotatable in the opposite direction, by way of a clutch arrangement disposed between the parts. By this arrangement, the internal part can shift axially on a threaded shank to move the rotatable wheel, and by that movement, compensate for lining wear. This arrangement suffers from the drawbacks associated with the earlier discussed prior art in its complexity and cost to manufacture and its potential for failure and requirement for maintenance.

SUMMARY OF THE INVENTION

It is an object of the present invention to provide an adjuster strut which is of reduced complexity compared to known struts.

According to the present invention there is provided an adjuster strut for use in a drum brake assembly to shift the brake shoes of the assembly radially outwardly to as to compensate for wear in brake friction lining, said strut being of adjustable elongate extent and having axially extended and retracted conditions, said strut including engagement means disposed at opposite ends thereof for engaging opposed braking members of the brake assembly, a rotatable member which is rotatable about the lengthwise axis of said strut, an axially movable member which is movable axially upon forward rotation of said rotatable member to lengthen the elongate extent of said strut, in said retracted condition, and biasing means for biasing said strut toward said axially extended condition upon radial expansion of the brake shoes of said brake assembly during brake actuation, said rotatable member having an axially disposed face and a cam surface formed on said face, said cam surface defining a plurality of teeth formed in an annular ring, said strut including an elongate arm which is mounted for resilient pivoting movement and which includes a free end portion biased resiliently into engagement with said cam surface at least during axial extension of said strut, said arm being disposed at an oblique angle relative to said axially disposed face, wherein in use, said arm resiliently pivots during axial extension of said strut to said axially extended condition and causes said rotatable member to rotate in said forward direction, said biasing means being arranged to resist rotation of said rotatable member in a reverse direction opposite to said forward direction upon said strut moving from said axially extended condition to said axially retracted condition during radial contraction of said brake shoes, so that the elongate extent of said strut in said axially extended condition is not reduced as said strut moves to said axially retracted condition.

For the purposes of this specification, the expression "braking members" is to be understood as including the opposed brake shoes of a brake assembly and if provided, the parking brake lever of the assembly.

In one arrangement, upon separation of braking members during brake actuation, the rotatable and axially movable members are shifted by the biasing means to an axially extended position, and the arm resiliently pivots from a rest or home position in a forward direction and by that pivoting movement, the free end of the arm rotates the rotatable member in the forward direction to relatively extend the axially movable member. Upon return movement of the braking members the rotatable and axially movable members retract axially from the axially extended position, while the arm returns to the rest position which causes the free end of the arm to shift relative to the cam surface in the reverse direction. Upon sufficient shifting movement (upon sufficient lining wear), the free end moves past one tooth of the cam surface to a position adjacent a circumferentially spaced tooth. In this arrangement, each time the arm is positioned adjacent a new tooth, it is positioned to catch or engage that new tooth and to rotate the rotatable member forward by that engagement during radial expansion of the brake shoes.

In most arrangements, the arm can be arranged to operate either in tension or compression. In the above arrangement the arm typically would undergo tensile loading when the axially movable member is shifted axially outwardly to extend the length of the strut and that tensile loading would cause the arm to pivot and rotate the rotatable member in the forward direction. However, it equally is permissible that the arm be arranged for compression loading to rotate the rotatable member and in that arrangement, rotation of the rotatable member occurs during return axial movement of the axially movable member. In this latter respect, the arm may pivot and thus the free end portion thereof may shift relative to the cam surface during outward axial movement of the axially movable member, without rotating the rotatable member in the forward direction. However, if that shifting movement is sufficient, the free end portion may engage a tooth of the cam surface, such that upon return axial movement of the axially movable member, with the arm in compression, the arm may rotate the rotatable member in the forward direction and thus adjustably lengthen the strut as required.

The arrangement of the arm to act either in tension or compression is considered to be a matter of design choice. It is therefore to be appreciated that where reference is made in this description to a particular arm arrangement, the likelihood is that the arm could be arranged to operate in the desired manner either in tension or compression.

In one form of the invention, the arm is mounted to the strut, such as to the body of the strut, or to a bracket connected to the body, and the arm extends in the manner required into engagement with the cam surface of the rotatable member. Alternatively, the arm may be fixed to or depend from a part of the brake assembly to which the adjuster strut is applied. In one arrangement, the arm may be mounted by attachment to the radially inwardly depending web of a T-shaped brake shoe. Thus, the actual mounting position of the arm can vary, as long as the reaction of the free end of the arm with the cam surface of the rotatable member is maintained as defined. In this respect, it is necessary that the mounting position of the arm is one which experiences movement relative to the rotatable body, so as to cause the arm to pivot and rotate the rotatable member during brake actuation, or alternatively, during brake release (depending on the manner in which the arm is arranged to operate).

It is preferable that the arm of the strut be formed from a flat plate and that the free end be sufficiently hard to resist wear during engagement with the cam surface. The free end may be hardened for that purpose. The arm is preferably mounted obliquely to the axis of the strut so that the free end of the arm can cause the rotatable member to rotate upon axial extension of said strut.

The rotatable member is preferably of circular cross-section and the teeth defined by the cam surface are preferably defined about the periphery of the axial face of the rotatable member. Each tooth may present an inclined surface in at least the forward direction of rotation of the rotatable member, although it is preferable that the teeth are formed to have inclined surfaces on both sides thereof diverging or converging in opposite directions. Those sides preferably converge to a pointed apex and the inclined sides between adjacent teeth preferably intersect to define an inverted and pointed apex. If the teeth of the cam surfaces are formed with inclined opposite faces, the free end of the arm can be arranged to slide down the rear face and further rotate the rotatable member during return axial movement of the rotatable and axially movable members.

The teeth of the rotatable member can have any suitable pitch and height, and the arm can have any suitable angle of attack relative to the axial face of the rotatable member, dependent on the rate of change of axial extension and the desired axial travel of the axially movable member to compensate for friction lining wear. The shape and size of each tooth may be arranged so as to not result in axial extension of the axially movable member relative to the rotatable member upon every brake actuation. Indeed that arrangement is preferred, as the brake assembly is typically required to be applied a substantial number of times before wear of the friction lining becomes sufficient to require compensation by way of an incremental tooth rotation of the rotatable member. Thus, while the arm may rotate the rotatable member upon brake actuation, the free end of the arm may only travel fully past one tooth and reposition between a new pair of adjacent teeth, after as many brake applications are applied as are required for the friction lining to wear an amount sufficient to require compensation. If the arm free end does not fully increment past a tooth to reposition between a new pair of adjacent teeth, it may rest between brake applications, on the tooth surface, or on the cam surface between adjacent teeth. For example, if the teeth have oppositely inclined converging faces, and if the arm free end does not slide fully over the forward facing inclined tooth surface and reposition between a new pair of adjacent inclined surfaces, it may rest between brake applications, on the first mentioned inclined surface between the base and the peak thereof. The arm free end will rest at or near to the base between adjacent teeth when it has just incremented past a tooth, and can rest against the inclined surface of a tooth closer to the peak thereof when the lining has worn, but when the wear is not enough for the arm to increment past the peak.

In circumstances when the arm rests against an inclined forward facing surface of a tooth between brake applications, the arm, by its resilient bias, may apply a force tending to cause the rotatable member to rotate in the reverse direction. However, the invention includes means resisting or limiting that movement such that the overall movement provides for a net forward shift in the rotatable member regardless of any reverse movement. The biasing means, performs this function as hereinafter described.

The arrangement of the arm and the biasing means is such as to apply frictional resistance against movement of the rotatable member in the reverse direction, but to allow movement in the forward direction. Because the free end of the arm engages the cam surface in an oblique manner and catches a tooth only for forward rotation thereof, the force applied to the rotatable member by the arm in the forward direction is greater than in the reverse direction. The biasing means therefore applies a force resisting rotation of the rotatable member, that exceeds any force applied by the arm to the rotatable member in the reverse rotating direction, but which is less than the force applied by the arm to the rotatable member in the forward rotating direction. The resistance to reverse rotation permits the free end of the arm to shift in a net forward movement relative to the cam surface upon separation or return movement of the braking members preferably without any, or at most minor reverse rotation of the rotatable member. As discussed, if the free end does not increment fully over and past the highest point (relative to the arm swing movement) of the tooth profile, it may rest against that profile surface until further and sufficient lining wear takes place. Given that a substantial number of brake applications may occur before lining wear becomes sufficient for wear compensation, the free end rest position between brake actuations may slowly creep or progress up the inclined surface over successive brake applications.

In each of the embodiments described, it is the cooperation between the arm and the teeth of the cam surface that promotes rotation of the nut in the forward direction. Without the teeth, the arm would not "catch" the cam surface and cause it to rotate. The invention is not restricted to any particular form of tooth profile, as long as the above-mentioned cooperation takes place.

BRIEF DESCRIPTION OF THE DRAWINGS

The attached drawings show example embodiments of the invention of the foregoing kind. The particularity of those drawings and the associated description does not supersede the generality of the preceding broad description of the invention.

FIG. 8 shows a further embodiment of an adjuster strut according to the invention.

FIG. 9 is a detailed view of the arm mounting arrangement of FIG. 8.

FIG. 10 is a detailed view of the spring arrangement of FIG. 8 taken at right angles thereto.

FIG. 11 is a cross-sectional view taken through XI—XI of FIG. 8.

FIG. 12 shows a further embodiment of an adjuster strut according to the invention.

FIG. 13 is a detailed view of an alternative composite bimetal spring arrangement of FIG. 12.

FIG. 14 is a cross sectional view taken through XIV—XIV of FIG. 12.

DETAILED DESCRIPTION

Figure 1:
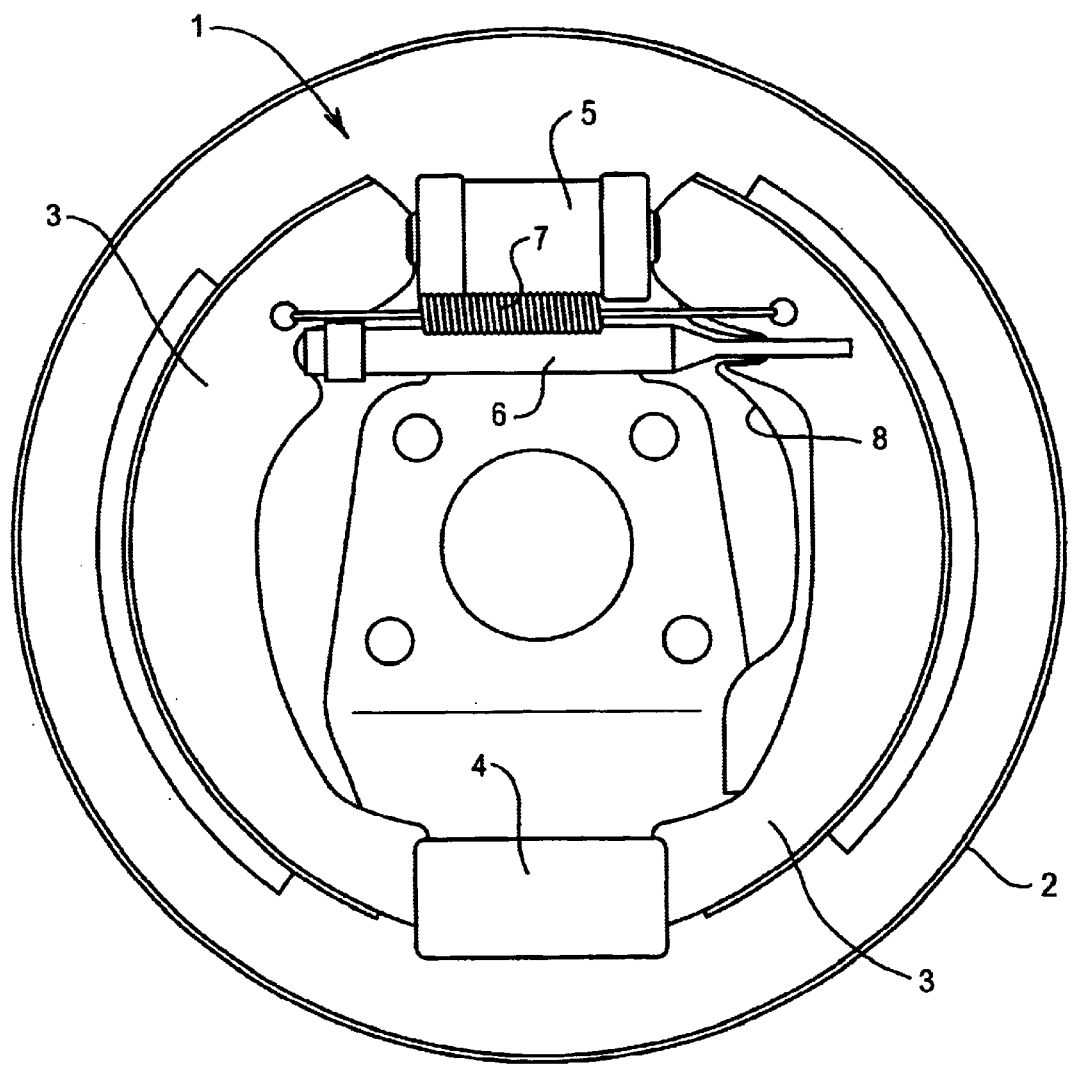
FIG. 1 shows a prior art drum brake assembly.
Figure 2:
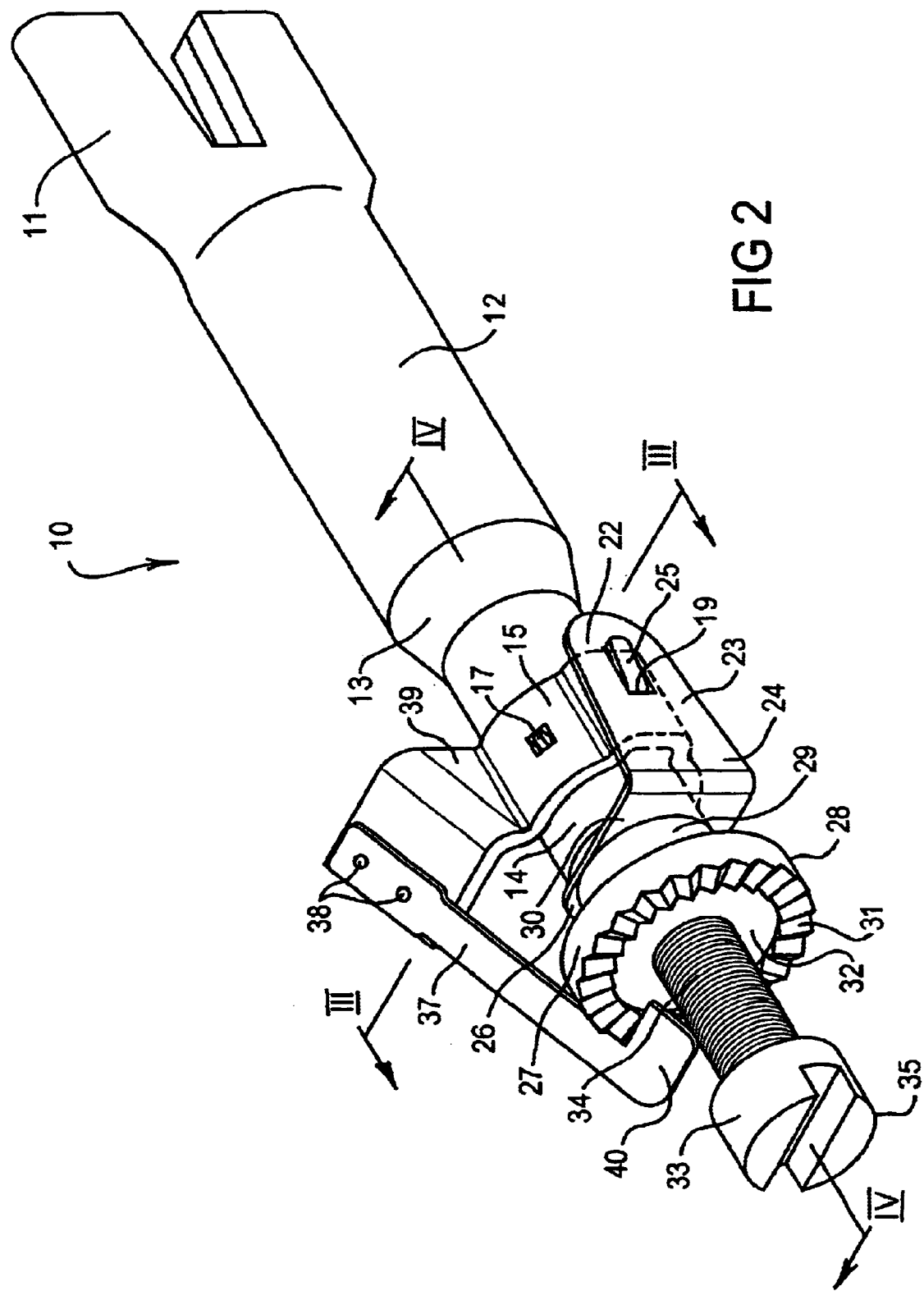
FIG. 2 shows an adjuster strut according to one embodiment of the present invention.

Referring to FIG. 2, the adjuster strut 10 is of elongate form and includes a bifurcated end 11 for locating that end of the strut against the radially inwardly depending web of a parking brake lever 8 (see FIG. 1). Depending from the bifurcated end 11 is a body 12. The body 12 can be of any suitable length depending on the width of the gap between opposed brake shoes that the strut 10 is required to straddle. The body 12 shown is cylindrical, although it could have any suitable cross-section, such as square or rectangular.

The body 12 includes a tapered neck 13 (although this is not essential), which tapers to an at least partly tubular head section 14. The head section 14 is also cylindrical, but of a smaller diameter compared to the section of the body extending between the neck 13 and the bifurcated end 11. Likewise, the head section 14 could have other suitable cross-sections.

Figure 3:
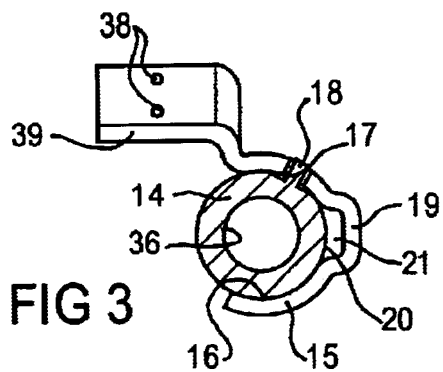
FIG. 3 is a cross-sectional view through III—III of FIG. 2.

A bracket 15 is attached to the head section 14 as shown in FIGS. 2 and 3. The bracket 15 is shown having a generally cylindrical inner surface 16 of the same diameter of the outer surface of the head section 14, so as to fit generally flush against that surface. However, the bracket 15 is formed to be resiliently expandable to fit about the head section 14 as shown, so that the bracket may be clipped on to the head section. Alternatively, it can be attached to the body by any other suitable methods. The bracket 15 extends approximately about half the circumference of the head section 14, and is held against movement relative to the head section 14 by the provision of an opening 17 formed in the bracket for receiving a protrusion 18 extending from the head section. The protrusion 18 may be formed in any suitable manner and in FIG. 3, the protrusion 18 is formed as an integral extension by machining the head section 14. In an alternative arrangement, a grub screw may be threaded into position in the head section 14 and protrude into the opening 17 in the same manner. Further alternatives also exist such as permanent fixing by welding, or by machining a suitable platform when the head section is formed.

The bracket 15 includes an outwardly extending raised section 19 that extends away from the outer surface 20 of the head section 14 to provide a cavity 21 between the outer surface and the inner surface 16 of the bracket 15. That cavity 21 is provided to accommodate a leg section 22 of a leg 23 of a leaf spring 24. The leg 23 includes an elongate slot 25, that permits the bracket 15 to extend therethrough and thereby locate the leaf spring relative to the head section 14. The leaf spring 24 is angularly located by the bracket 15 to the head section 14, but a more secure arrangement is not required. The leaf spring 24 includes a foot 26 that extends at an obtuse angle, for example at approximately 95° to the leg 23. That angle is however, able to be altered, depending on the characteristics of adjuster construction and performance required. The foot 26 engages the underneath surface of a nut 27 and exerts a biasing influence on the nut in a direction approximately axially away from the head section 14. The leaf spring 24 illustrated is one form of biasing means appropriate for the invention. Thus, other biasing arrangements may equally be employed. Such a further biasing means is shown in FIGS. 12 to 13. That biasing means is shown applied to an adjuster strut similar to that of FIG. 2 and for descriptive purposes, it will be convenient to reference like parts with the same reference numerals, plus 300.

The adjuster strut 300 differs from the strut 10 by virtue of the biasing means 70. The biasing means 70 differs from the arrangement of the leaf spring 24, in that it does not require the inter-engagement of the bracket 15 through the slot 25 of the FIG. 2 arrangement. The biasing means 70 however still includes a leaf spring 71, and to assist in understanding the operation of the biasing means 70, reference is made to FIG. 13 which shows an equivalent leaf spring 71. However, in the FIG. 13 embodiment, the leaf spring 71 is modified to include a bimetal strip 73, for purposes which will be described later. As shown in FIG. 13, the leaf spring 71 engages the head section 314 of the strut 300 at two regions $P_1$ and $P_2$ on opposite sides of the head 314. The spring 71 also engages the end face 330 of the nut 327, at a position substantially axially aligned with the engagement position of the arm 337 with the cam surface 331. Such substantial axial alignment is preferred to prevent or minimise rocking or tilting movement of the nut 327 during axial extension and retraction of the strut 300. This type of arrangement is discussed further in relation to FIGS. 4 and 7. The spring 71 is prevented from rotation about the longitudinal axis of the strut 300, by engagement within a recess 72 in the bracket 315, which is most clearly shown in FIG. 14. The forward end of the spring 71 as shown in FIG. 12 is formed with a U or V configuration to contact the head 314 at two different points. This centralises the spring 71 to eliminate or reduce the possibility of interference between the spring and the shank of the screw 333.

The spring 71 acts against both the nut 327 and the head 314 to bias the nut away from the head, in much the same manner as the leaf spring 24. However, the arrangement of FIGS. 12 to 14 is considered to be more advantageous, because it permits the bracket 315 to have a more simplified construction. In that respect, the bracket can be attached to the head 314 by a press fit (or other suitable arrangement). It is also considered that a spring of this kind will be easier to fit to the strut than the spring 24.

The different biasing arrangements shown in FIGS. 2 and 12 illustrate that the biasing means can take a variety of different forms. The biasing means is therefore not restricted to a particular biasing arrangement.

Returning to FIG. 2, the nut 27 is formed with a head 28 and a neck 29, which are both cylindrical, but of different outside diameters as shown. The end face 30 of the neck 29 is engaged by the foot 26 of the leaf spring as described above, while the outer edge 31 of the end face 32 of the head 28 is a cam surface, forming an annular ring of teeth. The teeth are formed by a series of oppositely inclined faces creating a surface of adjacent peaks and troughs. The teeth could however be formed in a different manner, such as in a sinusoidal form or castellated arrangement comprising a series of upright square or rectangular members that are spaced apart.

The nut 27 includes a threaded bore into which a screw 33 is threaded. The screw 33 has a threaded shank 34 and a slotted or bifurcated head 35. The head 35 is slotted to engage the radially inwardly depending web of a second and oppositely facing T-shaped brake shoe in the same or similar manner to the bifurcated end 11. Engagement of the screw 33 with the web of a brake shoe prevents rotary movement of the screw relative to that web. Thus, when the adjuster strut 10 is fitted to a pair of brake shoes, each end of the strut, namely the bifurcated end 11 and the screw 33 are held by the respective brake shoes against rotation.

Figure 4:
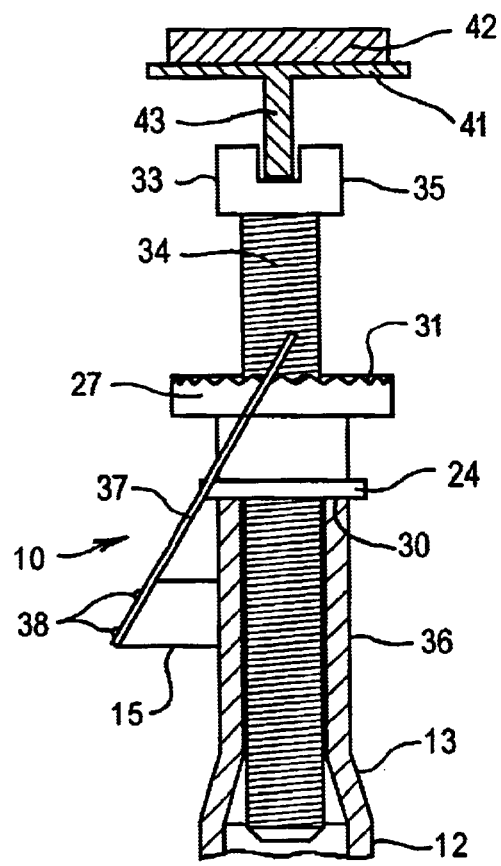
FIGS. 4 and 4A are cross-sectional views through IV—IV of FIG. 2.

The threaded shank 34 extends through each of the nut 27, the foot 26 of the leaf spring 24, and the tubular end portion 36 (see FIGS. 3 and 4). The interior surface of the tubular portion 36 of the head section 14 is not threaded and provides clearance between it and the threaded shank 34, which is therefore freely rotatable therewithin. This arrangement also permits the threaded shank 34 to move axially within the tubular portion 36 relative to the head section 14 upon relative rotation between the nut 27 and the screw 33.

The adjuster strut 10 further includes an arm 37 that is secured by nuts or rivets 38 to an arm 39 of the bracket 15. The arm 37 extends from the arm 39 to the end face 32 of the nut 27 and a free end 40 of the arm 37 engages the annular ring of teeth of the cam surface 31 thereof.

The length of the adjuster strut 10 is altered by rotation of the nut 27. Nut rotation results in axial movement of the screw 33 either to lengthen or shorten the axial length of the strut 10. In use, as discussed earlier, the strut 10 is employed to take up any wear of friction lining and therefore it is normal for the strut to extend. Shortening of the strut 10 is however necessary when new lining is applied to the brake shoes.

When the strut 10 is fitted to a brake shoe arrangement of the kind shown in FIG. 1, each of the bifurcated ends 11 and 35 engage about the radially inwardly depending webs of the brake shoes and/or the parking brake lever and that engagement locates the screw 33 axially. Upon radial expansion of the brake shoes under brake actuation, the webs are displaced axially (relative to the strut) and the screw 33 is no longer axially restrained in the same position by its respective web. The axial position of the screw 33 is then controlled by the leaf spring 24 and the arm 37, the leaf spring pushing against the neck 29 of the nut 27 to move the screw 33 axially outwardly, while the free end 40 of the arm 37 constrains that outward axial movement. However the particular configuration of the cam surface 31 of the nut 27 and the cooperation thereof with the arm 37 is such as to permit rotation of the nut 27 about the axis of the screw threaded shank 34 during axial movement of the nut 27 and the screw 33. The mechanics of that motion are shown in FIGS. 4 and 5.

Figure 4A:
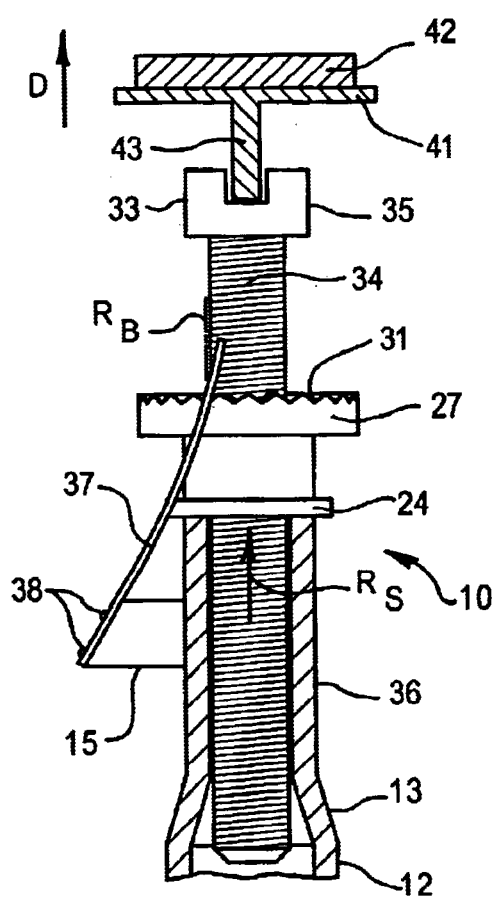

Referring to FIG. 4, a part cross-sectional view of the adjuster strut 10 is shown. This view shows the strut 10 in a rest or brakes off condition when the brake shoes are radially contracted, such as in FIG. 1. In FIG. 4, a brake shoe 41 and a friction lining 42 attached thereto are shown. The web 43 of the brake shoe 41 is shown received within the bifurcated screw head 35. As shown in FIG. 4, the engagement between the web 43 and the head 35 is such as to locate the screw 33 against outward axial movement. Upon radial expansion of the brake shoe 41, as shown in FIG. 4a, the brake shoe is displaced in the direction D and the web 43 no longer holds the screw 33 against outward axial movement so that the leaf spring 24 engaging the end face 30 of the nut 27 shifts the nut and also the screw 33 in the direction D, thereby maintaining the web 43 in engagement with the screw head 35. Outward axial movement of the screw 33 is restricted by the free end 40 of the arm 37, however the ability of the arm 37 to pivot permits limited outward axial movement.

Figure 5:
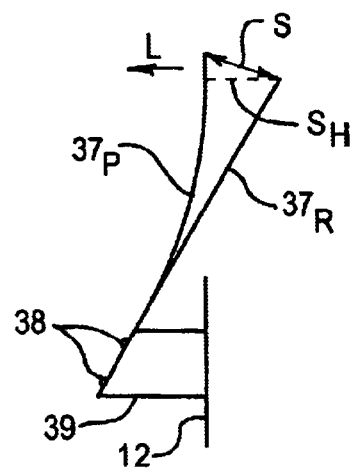
FIG. 5 is a view showing the tangential and axial components of movement imparted by the pivotal movement of the arm of FIG. 2.

Upon outward axial movement of the screw and nut arrangement, the arm 37 is caused to pivot to the position 37p in the manner shown in FIG. 5 with a resultant shift of the foot portion 40 thereof an amount S in a direction L, lateral to the arm 37. Because of the oblique engagement of the free end 40 with the cam surface 31, the free end catches a tooth of that surface and rotates the nut 27. That is, the lateral shift of the foot portion 40 causes the nut 27 to rotate an amount in the direction L lateral to the direction D equal to the shift $S_H$ by virtue of the foot portion 40 being caught in the trough between adjacent teeth. This rotation occurs despite the frictional engagement between leaf spring 24 and the nut 27, because the rotational force imposed on the cam surface by the arm 37 exceeds the frictional force. This rotation of the nut 27 causes outward axial movement of the screw 33 by virtue of the threaded connection between the threaded shank 34 and the nut.

When the brake actuating force is removed, the brake shoe 41 returns in the axial direction opposite to the direction D under the influence of a return spring (such as the return spring 7 of FIG. 1). Axial return movement of the screw 33 and thus the nut 27 allows the arm 37 to return to substantially the rest or home position $37_R$ shown in FIG. 5, although the nut 27 is restrained against reverse rotation by its frictional engagement with the leaf spring 24. Thus, the foot portion 40 of the arm 37 will shift relative to the cam surface 31, riding up the inclined surface of a tooth of the cam surface 31. If the outward axial movement of the screw 33 is sufficient, then by the return axial movement of the screw 33, the foot portion 40 will ride up and over the apex of the tooth and down the opposite inclined face (which is preferred), positioning the arm 37 for the next incremental adjustment. Thus, the nut 27 is rotated by the movement shown and described in FIG. 5 during radial brake shoe expansion. Thus, the profile of the cam surface 31 is formed appropriately such that an incremental shift in the nut 27 is sufficient to extend the threaded shank 34 enough to compensate for lining wear, but importantly, not to over compensate.

Like known adjuster struts, the adjuster strut 10 conveniently provides gradual or incremental adjustment each time wear of the friction lining exceeds a certain predetermined amount. Thus, the strut 10 operates in a manner which has been found acceptable to the automotive industry. However, the strut 10 includes only six separate components which makes its manufacture and assembly significantly less complex than known adjuster struts.

Put simply, the adjuster strut comprises two groups which are relatively movable axially, i.e. are movable together or apart, and that movement is caused by two different forces which respectively act in opposite axial directions. The first force is applied by the braking members to each end of the strut generally by the shoe return spring and that force applies a compressive force to the strut tending to move the two strut groups together. The second force is applied by the leaf spring which tends to move the two strut groups apart. In a "brake-off" condition, the shoe return spring dominates and the two groups are firmly held together. In a "brake-on" condition, the hydraulic actuator overcomes the shoe return spring which permits the leaf spring to bias the two groups apart and to allow the compensation mechanism to act. It is this back and forth motion that results in rotation of the nut 27 to axially shift the screw 33 upon wear of friction lining.

Figure 6:
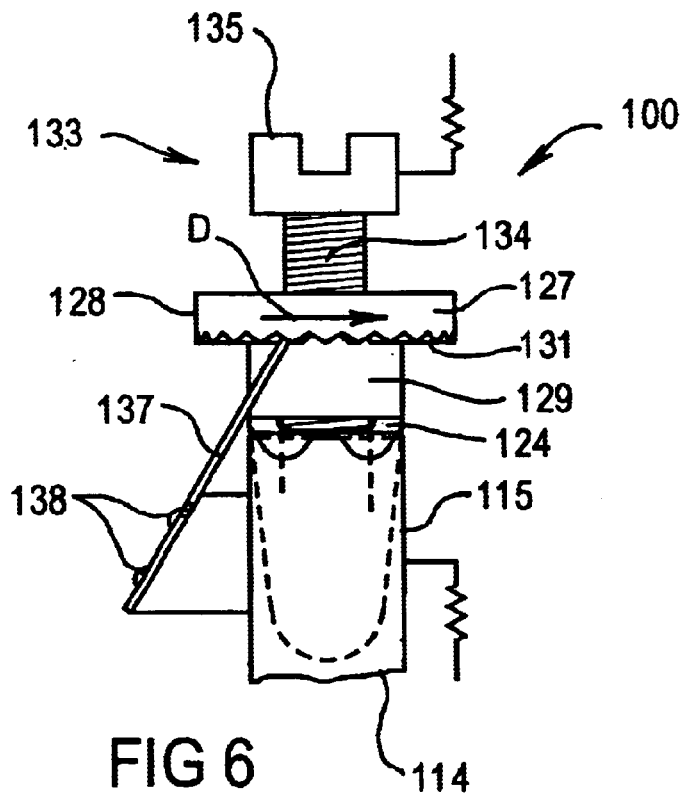
FIG. 6 is a part view of an adjuster strut according to another embodiment of the present invention.

The adjuster strut 10 shown in the drawings can be modified if desirable in a number of ways. For example, it is possible to provide the cam surface on the opposite face of the nut 27, so that it faces the head section 14 of the body 12. In that arrangement, the arm 37 may still include a foot portion 40 for engaging the face of the nut 27, or the arm 37 may extend without such a foot portion directly into engagement with the nut. Such an arrangement is shown in FIG. 6, in which like parts relating to the earlier drawings are identified by the same reference numeral, plus 100. The adjuster strut 100, includes a leaf spring 124, a nut 127 having a cam surface 131 facing the head section 114 of the strut body. If additional biasing means are required, biasing means can be applied both to the screw 133 and the strut body in opposite directions as shown, to assist to maintain those parts of the strut in engagement with the shoe web and the park brake lever respectively (in the same manner as the adjuster strut 10). Any suitable biasing means can be employed for that purpose.

The arm 137 is fixed to the bracket 115 by rivets 138 and extends into engagement with the cam surface 131 at an oblique angle thereto as shown. The arm 137 is shown with the strut 100 in an axially extended condition and the nut 127 undergoes rotation in the direction D upon axial return movement thereof by its engagement with the free end of the arm 137. That is, as the nut 127 returns axially, its engagement with the arm 137 requires it to rotate. Like the previous embodiments, engagement of the leaf spring 124 with the nut 127 resists reverse rotation of the nut 127.

In a further modification of the adjuster strut 10, the bracket 15 may be modified such that it comprises a machined component instead of a largely pressed and stamped component as shown in the drawings.

Of importance to the invention and with reference to FIGS. 2 to 5, is that the free end of the arm 37 be disposed obliquely to the axis of the nut 27 and therefore be inclined relative to the axial end face 32 of the nut 27, so that engagement between the free end and the cam surface is such as to promote forward rotation of the nut 27 upon sufficient axial movement thereof.

In a preferred arrangement according to the invention, the arm 37 is formed from temperature sensitive material, such as a bimetallic material or a shape memory metal, or includes a bimetallic material or shape memory metal, that causes the arm to move in the direction L (FIG. 5) and out of engagement with the cam surface 31, when the brake assembly to which the strut 10 is connected, heats through prolonged or excessive use. Such an arrangement prevents the arm 37 from rotating the nut 27 and extending the screw 33 in circumstances when the heat allows the brake shoes to be radially expanded more than would occur when the brake operates under normal conditions. That typically would occur because of heat expansion of the brake drum. In such heated circumstances, the brake shoes will undergo greater radial travel to engage the friction lining against the braking surface of the drum than under normal circumstances, and if the arm 37 remains in engagement with the nut 27, the arm can cause the nut to rotate and extend the screw 33, even though the friction lining has not worn to a level that demands compensation. That can result in over adjustment of the adjuster strut and may cause engagement of the friction lining with the drum braking surface when the brake assembly has cooled thus causing brakes-off drag.

The arm 37 may be formed out of a suitable temperature sensitive material, or if such a material does not perform in the manner required (a bimetallic material or a shape memory metal may not have suitable resilience for example) the arm may be formed from a suitable material, such as a resilient spring material to which a bimetallic or memory metal strip is attached. Thus, the arm 37 may be formed in a composite manner.

In an alternative arrangement, the leaf spring 24 of FIG. 2 may be formed of a temperature sensitive material, while the arm 37 is formed of a standard spring material. In this arrangement, the spring 24 may reduce the biasing influence applied to the nut 27 during excessive heat conditions, to disable engagement between the free end 40 of the arm 37 and the cam surface 31 of the nut 27, thereby disabling the adjusting mechanism of the adjuster strut. It may not be necessary that the entire spring 24 be formed from a temperature sensitive material, but rather, only the foot 26 for example, may be formed from that material. Alternatively, and preferably, the leg 23 may be formed from the temperature sensitive material. A still further alternative exists in that the spring 24 may be formed from spring steel and be acted on by a temperature sensitive material in any suitable manner to achieve the desired disabling movement.

It will be appreciated that a wide variety of alternative arrangements for the above purpose could be employed. For example, in the arrangement shown in FIGS. 12 to 14, the leaf spring 71 has a different shape to the leaf spring 24, yet that spring could also be formed of a temperature sensitive material, either fully or as a composite construction. Alternatively, a member made out of such a material, or an assembly employing such a material could act on the spring 71 for the same purpose. For example, a bimetal strip 73 may be attached to the underneath surface of the leaf spring 71, such as by a rivet 74 and upon excessive heat conditions, that strip 73 may bend away from the underneath surface of the spring 71 at the end thereof remote from the rivet 74, so as to reduce the biasing influence of the spring 71 against the end face 330 of the nut 327.

Figure 7:
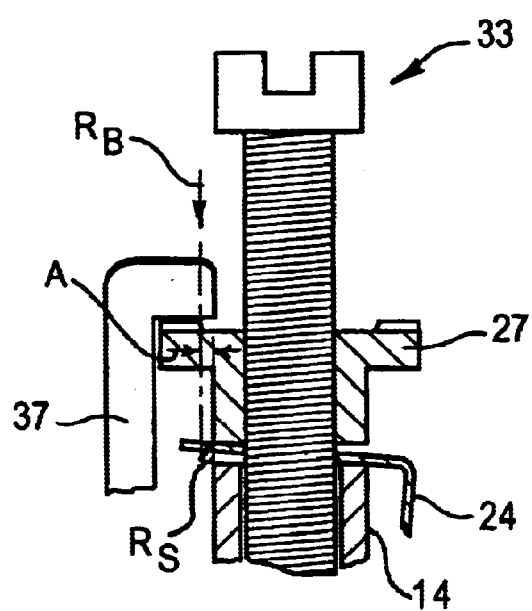
FIG. 7 is a view according to FIG. 4 but taken at right angles thereto.

The arrangement of FIG. 4 shows the substantial alignment of the opposing reaction forces $R_B$ (arm force) and $R_S$ (spring force) that act on the nut 27. This is further shown in FIG. 7, which is a cross-sectional view taken at right angles to the FIG. 4 view. In FIG. 7, a slight offset A is shown by way of example, and that offset imposes a small bias on the nut 27 which produces a tilting moment on the nut during axial extension and retraction. This is preferable, because zero offset can be unstable and the nut may rock one way or the other during actuation. Only a small offset and hence a small tilting moment is desirable however, as a large offset which causes a large tilting moment reduces efficiency of adjusting motion.

A further embodiment of the invention is shown in FIG. 8, and in this figure, the mounting position of the arm is on the web of a T-shaped brake shoe. In FIG. 8, like parts of FIG. 6 are identified by the same reference numeral, plus 100.

FIG. 8 shows a T-shaped brake shoe 50, having a radially inwardly depending web 51 and a platform 52 for supporting a friction lining (not shown). The web 51 is notched at 53 to accept and locate the bifurcated head 235 of the screw 233. The opposite end 211 of the adjuster strut 200 is also bifurcated and engages the inwardly depending web of a parking brake lever 208. The head 235 is an axially sliding fit on an unthreaded shank portion 234 of the screw 233. As will be described later, the head 235 is axially movable relative to the shank portion 234, on expanding and return movement of the brake shoes.

As with earlier described embodiments, the FIG. 8 arrangement includes a cam surface 231, which is formed into a plurality of teeth arranged in an annular ring. The cam surface 231 is axially disposed and faces away from the head 235 and is provided on a flange 227 which is formed integrally with the unthreaded shank portion 234 as well as a threaded shank portion 54. The threaded shank portion 54 is threadably engaged within a tubular strut portion 55. The flange 227 is generally equivalent in most respects to the rotatable nut provided in the earlier embodiments. However, it is termed a "flange" on the basis of its integral formation with each of the shank portions 234 and 54. In the FIG. 8 arrangment, axial movement between the respective threaded and tubular portions 54 and 55 is by relative rotation only.

A arm 237 is mounted on the web 51 of the brake shoe 50 in the manner shown in FIG. 9. The web 51 is punched to form an opening 56 and a leg 57, the latter of which supports one end of the arm 237, by way of rivets 238. The arm 237 extends from the web 51, obliquely with respect to the longitudinal axis of the strut 200, to engage the cam surface 231 at an oblique angle for resilient pivoting movement upon axial extension of the strut. Axial extension of the strut 200 can occur by way of axial sliding movement of the head 235 relative to the unthreaded shank portion 234 and by relative rotation between the threaded portion 54 and the tubular portion 55. The axial sliding movement is promoted by a spring 58 that is disposed between the flange 227 and the head 235 and which imposes a biasing force therebetween to axially extend the strut 200. The spring 58 is shown in FIGS. 10 and 11 and from these figures, it can be seen that the spring is formed from bent flat plate which is hinged at 59 and which bears against facing surfaces of the head 235 and the nut 227. The spring 58 further includes an aperture 60 that permits accommodation of the unthreaded shank portion 234.

Upon brake actuation, the brake shoe 50 moves radially outwardly (the actuator that promotes that movement is not shown) and, in accordance with the previously discussed embodiments, the strut 200 extends lengthwise by sliding movement of the head 235 relative to the shank portion 234, and by that movement, the end 211 and the head 235 are maintained in engagement with the brake shoe web 51 and the parking brake lever 208 respectively. Sliding movement of the head 235 is essentially the same each time the brake assembly is actuated. Thus, while that movement results in an axial extension of the strut 200 during brake actuation, the head 235 is intended to return axially on the shank portion 234 when brake actuation is ceased and therefore, it contributes to no permanent extension of the strut 200 for lining wear compensation.

In the FIG. 8 arrangement, radial expansion of the brake shoes results in movement of the leg 57 and thus the arm 237, relative to the flange 227. That movement results in resilient pivoting of the arm 237 in a clockwise direction (as viewed in FIG. 8), so that the flange 227, and thus the threaded portion 54, is rotated in the direction D. The unthreaded shank portion 234 is also rotated, but that portion simply slips relative to the head 235. The relative rotation between the threaded portion 54 and the tubular portion 55, axially extends the strut 200.

The arrangement shown in FIG. 8 shows the brake shoe 50 radially expanded and thus the head 235 is in an axially extended condition under the biasing influence of the spring 58, leaving a gap G between it and the axial end of the shank portion 234. Upon return movement of the brake shoes, the head 235 slides axially on the unthreaded shank portion 234 toward the flange 227 and against the biasing influence of the spring 58, reducing or eliminating the gap G and closing the spring 58. The arm 237 resiliently pivots to its rest or home position and the free end thereof which is in contact with the cam surface 231, shifts relative to that surface in a direction opposite to the direction D. Upon sufficient shifting movement, the free end increments past a tooth of the cam surface to reposition between an adjacent pair of teeth.

Return rotation of the flange 227 is resisted by frictional contact between the face 61 of the flange 227 and the spring 58. That contact is shown in FIGS. 10 and 11 at C. The contact C is generally aligned with the contact between the arm 237 and the cam surface 231. The spring 58 is restrained against rotation by the provision of wings 62 shown in FIG. 11, that engage the face of the web 51 as shown. This assists to restrain the flange 227 against reverse rotation.

For assembly of the strut 200 in a brake assembly, it is preferable that the arm 237 be bent away from its home or rest position to disengage it from contact with the cam surface 231. This is also preferable when the strut is being automatically adjusted to the correct length in the production line, and when a brake shoe is being replaced in the field. In the FIG. 8 arrangement, the web 51 includes an opening 63, through which a pin may be inserted for that purpose. As shown in FIG. 8, the arm 237 overlaps slightly the opening 63 and a pin inserted into the opening will engage the arm and cause it to pivot or bend away from the position shown. When the strut 200 has been installed, the pin may be removed from the opening and the arm will return into connection with the cam surface 231 ready for operation.

The arrangement of FIGS. 8 to 11 is advantageous, in that a arm 237 formed of, or in part by a bimetallic strip, is exposed more directly to heat build-up in the brake assembly, because of its direct connection to the brake shoe 50. Additionally, the strip is better protected, by connection to the web 51 beneath the platform 52, while a bracket of the kind shown in FIGS. 2 and 4 is not required. As previously described however, the arm 237 may be made of normal spring metal and the spring 58 may be formed of a temperature sensitive material or as a composite with such a material, whereby on sufficient heat generation, the spring reduces its biasing influence, so that the arm 237 is disabled from the cam surface 231 of the flange 227. The spring 58 could, for example, be formed of a temperature sensitive material at its hinge 59, or more preferably, to be formed as a composite at that hinge.

The effect of the use of temperature sensitive materials, such as bimetals and shape memory metals as described hereinbefore, is as a disabling mechanism to disable the strut against axial extension at times when compensation for friction lining wear is not required, but when in the prevailing conditions, the assembly would otherwise permit the strut to lengthen axially. The examples given above relate to the use of temperature sensitive materials in the arm or biasing spring components of the adjuster strut. It is to be appreciated however, that the invention is not restricted to the use of temperature sensitive materials for the stated purpose only in respect of the arm and the biasing spring, but such materials could be employed as, or to act in other components of the adjuster strut to achieve the required disabling result.

It is to be appreciated that the arm of the invention as shown in the various embodiments, takes the form of a flat blade-like member. The arm of the invention is not however limited to such a blade and could for example be otherwise formed, such as by a suitable wire. Other materials or forms of arms could equally be employed.

The invention described herein is susceptible to variations, modifications and/or additions other than those specifically described and it is to be understood that the invention includes all such variations, modifications and/or additions which fall within the spirit and scope of the above description.

The claims defining the invention are as follows:

1. An adjuster strut for use in a drum brake assembly to shift opposed brake shoes of the assembly radially outwardly so as to compensate for wear in brake friction lining, said strut being elongate and lengthwise adjustable and having axially extended and retracted conditions, said strut including engagement means disposed at opposite ends thereof for engaging at least one brake shoe or a brake lever associated with a brake shoe, a rotatable member which is rotatable about the lengthwise axis of said strut, an axially movable member which is movable axially upon forward rotation of said rotatable member to lengthen said strut in said retracted condition, and biasing means for biasing said strut toward said axially extended condition upon radial expansion of the brake shoes of said brake assembly during brake actuation, said rotatable member having an axially disposed face and a cam surface formed on said face, said axially disposed face facing an axial direction and extending generally radially from the lengthwise axis of the strut, said cam surface defining a plurality of teeth formed in an annular ring, said strut including an elongate, resiliently flexible arm which is mounted at a first end thereof for resilient flexing movement to bias a free end portion thereof into engagement with said cam surface at least during axial extension of said strut, said elongate arm being disposed at an oblique angle relative to said axially disposed face, wherein in use, during axial extension of said strut to said axially extended condition and with said free end portion biased into engagement with said cam surface, said axially moveable member moves axially relative to said first mounted end of said elongate arm, and causes said arm to resiliently flex, which causes said free end portion to shift in a direction that causes said rotatable member to rotate in said forward direction, said biasing means being arranged to resist rotation of said rotatable member in a reverse direction opposite to said forward direction upon said strut moving from said axially extended condition to said axially retracted condition during radial contraction of said brake shoes, so that the elongate extent of said strut in said axially extended condition is not reduced as said strut moves to said axially retracted condition.

2. An adjuster strut according to claim 1, wherein said axially movable member includes a threaded shank and said rotatable member being threadably connected to said shank for relative rotation thereto.

3. An adjuster strut according to claim 2, wherein said strut is adapted to engage an opposed pair of brake shoes having a T-shaped cross-section defining an inwardly depending web, and wherein said axially movable member is formed with a slotted head for engaging the inwardly depending web of one of the T-shaped brake shoes.

4. An adjuster strut according to claim 2, said strut including an elongate body section having one of said engagement means at one end thereof and an open ended tubular section extending from the other end thereof, said tubular section accommodating a portion of said threaded shank in a manner permitting relative axial movement thereof, facilitating movement of said strut between said axially extended and retracted conditions and axial movement of said axially movable member upon forward rotation of said rotatable member.

5. An adjuster strut according to claim 4, said biasing means being disposed and acting between the open end of said tubular section and a facing surface of said rotatable member.

6. An adjuster strut according to claim 5, said biasing means being a leaf spring having a first section disposed at an angle to a second section, said first section being disposed between said open end of said tubular section and said facing surface of said rotatable member, and said second section being disposed substantially lengthwise of said body section and in engagement therewith.

7. An adjuster strut according to claim 6, said first section including an opening through which a portion of said axially movable member extends.

8. An adjuster strut according to claim 4, said arm being connected by a connection to said body section.

9. An adjuster strut according to claim 8, said connection between said arm and said body section being by way of a bracket fixed to said body section.

10. An adjuster strut according to claim 8, said axially disposed face facing away from said body section and said free end portion including a radially inwardly disposed foot portion extending in engagement with said cam surface.

11. An adjuster strut according to claim 8, said axially disposed face facing toward said body section.

12. An adjuster strut according to claim 1, said axially movable member including a threaded shank threadably received within a threaded opening in said strut and said rotatable member being fixed to said axially movable member, wherein forward rotation of said rotatable member rotates said axially movable member causing said axially movable member to shift axially outwardly relative to said opening.

13. An adjuster strut according to claim 12, said axially movable member and said rotatable member being integrally formed.

14. An adjuster strut according to claim 12, said strut including an elongate body section having one of said engagement means at one end thereof and said opening being defined by a tubular section extending from the other end thereof.

15. An adjuster strut according to claim 12, said axially movable m ember including a further shank extending coaxially with said threaded shank from an opposite side of said rotatable member, a head being disposed on said further shank and said head in use being fixed to a braking member of said brake assembly, said head being axially movable on and relative to said further shank during radial expansion and contraction of said braking members during brake actuation to facilitate movement of said strut between said axially extended and retracted conditions.

16. An adjuster strut for use in a drum brake assembly to shift opposed brake shoes of the assembly radially outwardly so as to compensate for wear in brake friction lining, said strut being elongate and lengthwise adjustable and having axially extended and retracted conditions, said strut including engagement means disposed at opposite ends thereof for engaging at least one brake shoe or a brake lever associated with a brake shoe, a rotatable member which is rotatable about the lengthwise axis of said strut, an axially movable member which is movable axially upon forward rotation of said rotatable member to lengthen said strut in said retracted condition, and biasing means for biasing said strut toward said axially extended condition upon radial expansion of the brake shoes of said brake assembly during brake actuation, said rotatable member having an axially disposed face and a cam surface formed on said face, said axially disposed face facing an axial direction and extending generally radially from the lengthwise axis of the strut, said cam surface defining a plurality of teeth formed in an annular ring, said strut including an elongate arm which is mounted for resilient pivoting movement and which includes a free end portion biased resiliently into engagement with said cam surface at least during axial extension of said strut, said arm being disposed at an oblique angle relative to said axially disposed face, wherein in use, said arm resiliently pivots during axial extension of said strut to said axially extended condition and causes said rotatable member to rotate in said forward direction, said biasing means being arranged to resist rotation of said rotatable member in a reverse direction opposite to said forward direction upon said strut moving from said axially extended condition to said axially retracted condition during radial contraction of said brake shoes, so that the elongate extent of said strut in said axially extended condition is not reduced as said strut moves to said axially retracted condition, said axially movable member including a threaded shank threadably received within a threaded opening in said strut and said rotatable member being fixed to said axially movable member, wherein forward rotation of said rotatable member rotates said axially movable member causing said axially movable member to shift axially outwardly relative to said opening, said axially movable member including a further shank extending coaxially with said threaded shank from an opposite side of said rotatable member, a head being disposed on said further shank and said head in use being fixed to at least one of a brake shoe and a brake lever associated with a brake shoe said head being axially movable on and relative to said further shank during radial expansion and contraction of said at least one of a brake shoe and a brake lever during brake actuation to facilitate movement of said strut between said axially extended and retracted conditions, said biasing means being disposed between said head and said rotatable member.

17. An adjuster strut according to claim 12, said arm being mounted on a brake member of said brake assembly.

18. An adjuster strut according to claim 1, said arm being formed from flat plate.

19. An adjuster strut according to claim 1, said arm being formed by wire.

20. An adjuster strut according to claim 1, said rotatable member being generally circular and said cam surface being defined about the periphery of said axially disposed face.

21. An adjuster strut according to claim 1, each tooth of said tee th being defined by mutually inclined surfaces.

22. An adjuster strut according to claim 1, said arm being formed at least partly from a temperature sensitive material that causes said arm to pivot and to disengage said free end portion from said cam surface, upon the temperature of said brake assembly exceeding a predetermined temperature.

23. An adjuster strut according to claim 22, said arm being formed out of a bimetal material or a shape memory material.

24. An adjuster strut according to claim 22, said arm being formed partly out of a bimetal material or a shape memory material.

25. An adjuster strut according to claim 1, said biasing means being formed at least partly from a temperature sensitive material that causes said biasing means to have a reduced biasing influence on said rotatable member upon the temperature of said brake assembly exceeding a predetermined temperature, so that axial extension of said strut is reduced or eliminated, and/or resistance to rotation of said rotatable member in said reverse direction is reduced or eliminated.

26. An adjuster strut according to claim 25, said biasing means being formed out of a bimetal or shape memory material.

27. An adjuster strut according to claim 25, said biasing means being formed partly out of a bimetal or shape memory material.

28. A brake shoe adjuster strut for use in a braking operation and a brake release operation, the strut comprising:

an elongate first body including a first end adapted to engage a brake lever or a brake shoe and an open, second end;

an elongate second body including a head adapted to engage a brake lever or a brake shoe and a threaded shank, the threaded shank being received in the second end;

a nut threaded on the threaded shank and adapted to lengthen the first and second bodies, the nut including a radially extending, end face and a cam surface on the end face, the cam surface having a plurality of positions;

a spring engaging the first body and the nut to axially bias the nut and the second body from the first body;

a single, resilient arm being cantilevered to the first body including a first end fixed to the first body and a second end in contact with one of the plurality of cam surface positions the second end being an only part of the resilient arm to contact the one of the plurality of cam surface positions, the arm extending at an oblique angle relative to the end face;

in the braking operation, the spring axially moves the nut and the second body relative to the first body an axial distance thereby causing the resilient arm to flex and rotate the nut; and in the brake release operation, first body and second body are axially compressed, the spring prevents the nut from rotating, if rotation movement of the nut was far enough, then the second arm end moves to a subsequent one of the plurality of cam surface positions, if rotational movement of the nut was not far enough, then the second arm end remains at the one of the plurality of cam surface positions.

29. The strut of claim 1, wherein lengthwise adjustment of the strut occurs during axial extension of the strut.

* * * * *